US008564668B2

(12) United States Patent
Plotsker

(10) Patent No.: US 8,564,668 B2
(45) Date of Patent: Oct. 22, 2013

(54) DUAL MODE DISPLAY RESOLUTION THERMAL IMAGER

(75) Inventor: Vadim Plotsker, Amherst, NH (US)

(73) Assignee: BAE Systems OASYS LLC, Manchester, NH (US)

( * ) Notice: Subject to any disclaimer, the term of this patent is extended or adjusted under 35 U.S.C. 154(b) by 1058 days.

(21) Appl. No.: 12/568,776

(22) Filed: Sep. 29, 2009

(65) Prior Publication Data

US 2011/0074823 A1 Mar. 31, 2011

(51) Int. Cl.
*F41G 1/38* (2006.01)
*H04N 5/33* (2006.01)

(52) U.S. Cl.
USPC ............. 348/164; 359/353; 42/119; 89/41.17

(58) Field of Classification Search
USPC ............ 89/41.17; 359/356, 353; 42/111, 119; 348/164
See application file for complete search history.

(56) References Cited

U.S. PATENT DOCUMENTS

| | | | | |
|---|---|---|---|---|
| 5,907,150 | A * | 5/1999 | Saldana | 250/214 VT |
| 6,131,294 | A * | 10/2000 | Jibiki | 42/119 |
| 6,608,298 | B2 * | 8/2003 | Gaber | 250/214 VT |
| 7,051,469 | B1 * | 5/2006 | Pochapsky et al. | 42/111 |
| 7,333,270 | B1 * | 2/2008 | Pochapsky et al. | 359/634 |
| 7,359,114 | B2 * | 4/2008 | Sauter et al. | 359/353 |
| 7,420,153 | B2 * | 9/2008 | Palmer et al. | 250/214 VT |
| 7,541,581 | B2 * | 6/2009 | Reed et al. | 250/330 |
| 7,746,551 | B2 * | 6/2010 | Schwartz et al. | 359/356 |
| 7,827,727 | B2 * | 11/2010 | Pochapsky et al. | 42/146 |
| 8,297,173 | B1 * | 10/2012 | Teetzel et al. | 89/41.17 |
| 2008/0043322 | A1 * | 2/2008 | Sauter et al. | 359/363 |

OTHER PUBLICATIONS

Breiter et al. "HuntIR thermal imagers for reconnaissance and targeting application" Proc. SPIE 5406, Infrared Technology and Applications XXX, 713 (Aug. 30, 2004).*
Couture, M., et al., "Design Challenges and Considerations for Image Fusion in Multi-Spectral Optical Systems," OASYS Technology, LLC, Manchester, NH, 8 pages, May 2006.

* cited by examiner

*Primary Examiner* — David Lazaro
(74) *Attorney, Agent, or Firm* — Houston & Associates, LLP

(57) ABSTRACT

A thermal imager comprises a thermal video detector for detecting thermal video images and generating a video signal representing those thermal video images. Often, imaging optics are used for imaging light onto the thermal video detector. A display mode selector is also provided for enabling a selection between different video display modes. A video controller then scales the video signal in response to the display mode of the selector for display on a visible video display, which receives the scaled video signal from the video controller and displays the thermal video images. In the typical application, the display mode selector is operated by a user to select between a hand-held mode or mode in which the imager is used with a non-magnifying gun weapon sight, on one hand, and a mode for use with a magnifying telescopic sight of a weapon, on the other. In these latter applications, possibly only a portion of output of the video display is imaged through the telescopic sight of the weapon. Here, the image is not upsampled into portions of the display that are not visible through the sight.

14 Claims, 2 Drawing Sheets

DUAL MODE DISPLAY RESOLUTION THERMAL IMAGER

BACKGROUND OF THE INVENTION

Thermal imagers are used for observation in low light conditions. They are typically sensitive to wavelength ranges that are outside the visible, in the infrared. This includes the near infrared and far infrared. Common applications include military and law enforcement for sighting weapons.

The thermal imagers include a thermal detector chip that detects light in the infrared wavelengths. The detected thermal video images are then displayed to the user on a visible-light video display.

Today, common video thermal detector chips have resolutions of, for example, 320 by 240 pixels. These are relatively low resolution devices compared with more common visible light detection chips, since visible light detector chips have the advantage of being applicable to consumer applications and thus capitalize on those large industries. Moreover, because the photons in thermal applications have lower energy, larger pixels are often required in thermal detector chips, which consequently lowers the total number of pixels per unit area of detector substrate.

On the other hand, visible video displays tend to be higher resolution. A common display resolution is 640 by 480 pixels (VGA). Such displays are often based on liquid crystal (LCD) or organic light emitting diode (OLED) technologies, enabling low power compact devices.

Thermal imagers will use up-sampling to address the resolution disparity between the thermal detector chips and the video displays. The output of each pixel in the lower resolution thermal detector chip is typically replicated into the surrounding, corresponding pixels in the video display. This allows the lower resolution thermal image detected by the thermal detector chips to be expanded into the higher resolution video displays so that the thermal images are displayed on the full scale of the video display.

SUMMARY OF THE INVENTION

Often, the thermal imagers will function in dual roles. The same thermal imaging system may sometimes be used in a hand-held mode where the user views the thermal images on the video display directly through the output aperture of the thermal imager and then later attached to a weapon and possibly optically mated with a telescopic scope of that weapon. In these latter applications, possibly only a portion of output of the video display is imaged through the telescopic sight of the weapon. As a result, there is a loss of information since the pixels from the thermal video detector have been upsampled to fill the larger visible video display, but only a portion of that display is visible through the telescopic sight. This suboptimally uses the information from the thermal video detector.

In general, according to one aspect, the present invention concerns a thermal imager. This thermal imager comprises a thermal video detector for detecting thermal video images and generating a video signal representing those thermal video images. Often, imaging optics are used for imaging light onto the thermal video detector. A display mode selector is also provided for enabling selection between different video display modes. A video controller then scales the video signal in response to the display mode of the selector for display on a visible video display. In the typical application, the display mode selector is operated by a user to select between a hand-held mode or mode in which the imager is used with a non-magnifying gun weapon sight, on one hand, and a mode for use with a magnifying telescopic sight of a weapon, on the other.

In the current embodiment, the resolution of the thermal video detector is less than the video resolution of the visible video display. Specifically, in the current example, the resolution of the thermal video detector is one quarter of the display resolution of the visible video display. Then, the video display selector enables user selection between a small video display mode in which the thermal video images are only displayed in a portion of the visible video display and a full scale display mode in which the video images are displayed in the entire or substantially the entirety of the video display.

In general, according to another aspect, the invention features a thermal image display method. This method comprises imaging light onto a thermal detector and detecting thermal video images with the thermal video detector. A thermal video signal representing the thermal video images is then detected. Also, the system receives selection of a display resolution mode. The video signal is then scaled in response to the selected video display mode. And the scaled thermal video images are then displayed on a visible video display.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
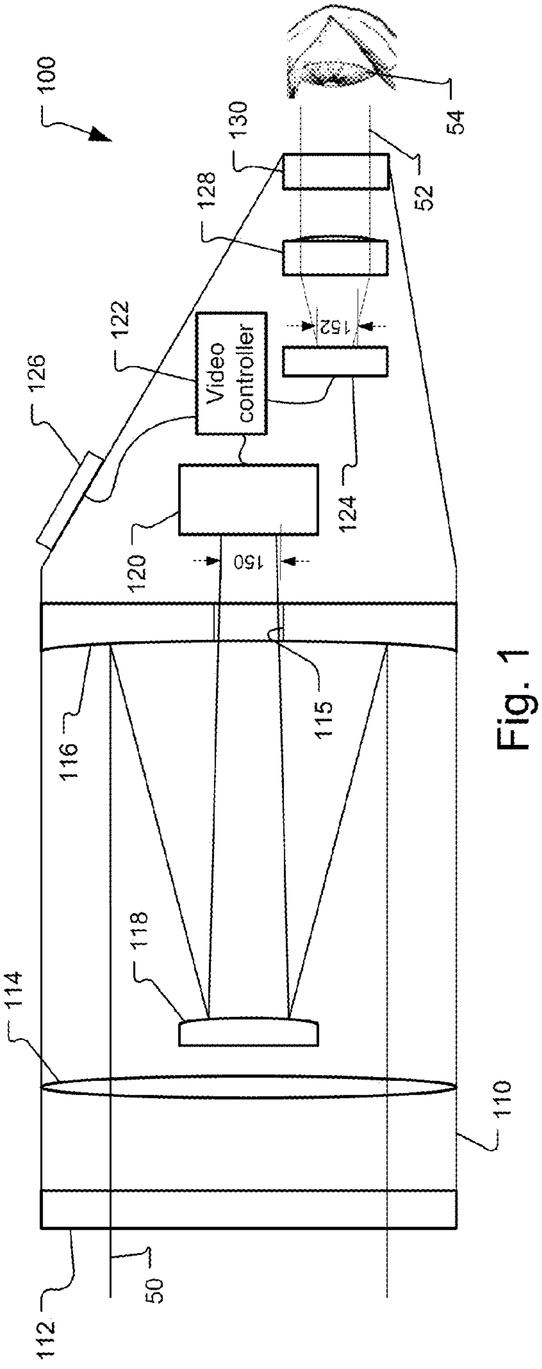
FIG. 1 is a schematic cross-sectional view of a thermal imager.

FIG. 1 shows a thermal imager that has been constructed according to the principles of the present invention.

Generally, the thermal imager 100 comprises an input aperture 112. This is typically covered with glass or other transmissive material. In some applications, the input glass aperture is optically coated to attenuate light outside the wavelength operating range of the thermal imager 100 such that the infrared light passes through the aperture into the imager but the visible is reflected or absorbed.

The incoming light 50 in some examples passes through a refractive element 114 or further filtering elements. The light is then collected by a primary mirror 116 and directed to a secondary mirror 118 in a Cassegrain configuration, in one example. The light 50 from the secondary mirror 118 in a typical configuration passes through a central aperture 115 of the primary mirror 116 and is detected by a thermal video detector 120. As described previously, the thermal video detector 120 tends to be a lower resolution device. In the current example, the resolution of the thermal video detector 120 is 320 by 240 pixels.

The thermal video detector 120 generates a video signal representing the thermal video images 150 produced by the light 50. This is provided to a video controller 122, which generates drive signals and video signals for a visible video display 124. In typical configurations, the visible video display is an LCD or OLED based display device.

The visible video images 152 generated by the visible video display 124 are typically imaged by visible light optics 128 at infinity. The visible light thermal video images then pass through the output aperture 130.

In a common application, the thermal imager 100 is used in a hand-held mode or open sight mode where the user's eye 54 directly views the visible thermal video images that are generated by the visible video display 124.

Figure 2:
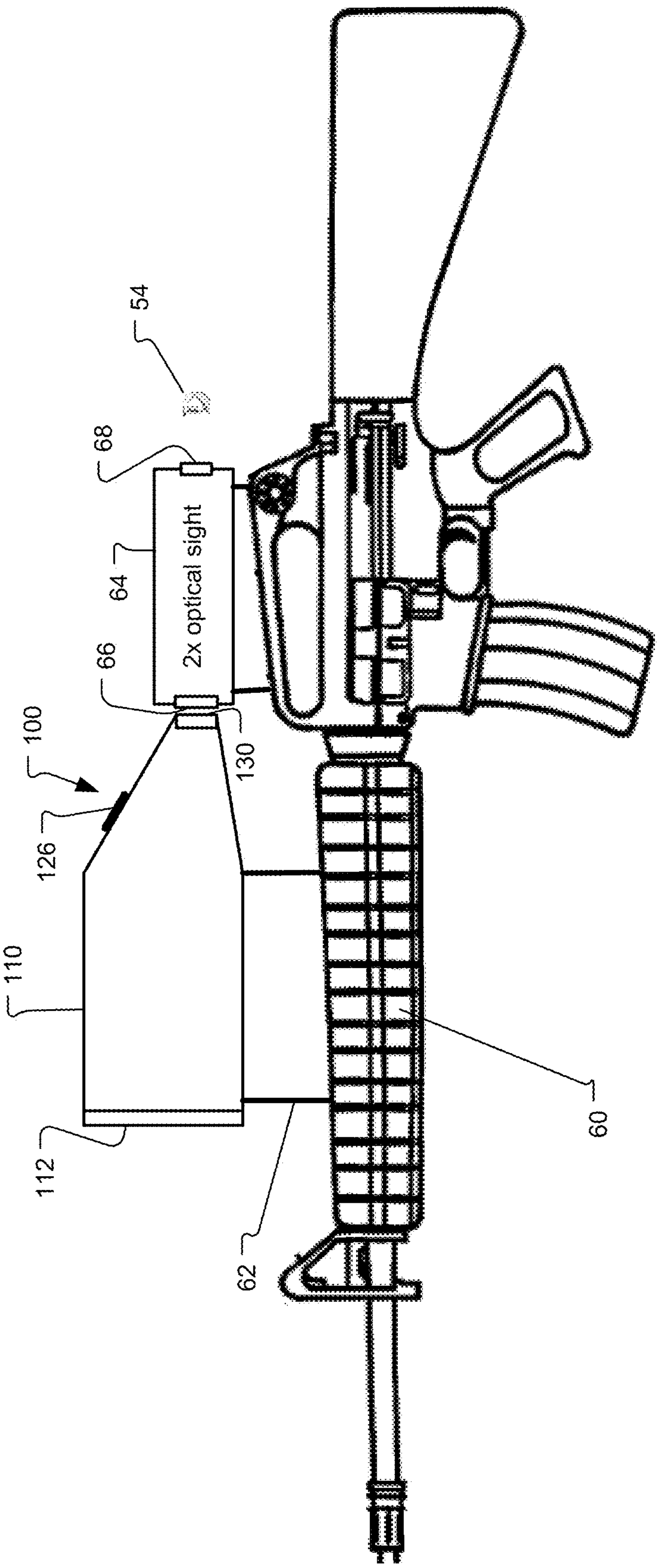
FIG. 2 is a schematic view of the thermal imager used with a weapon and mated into a telescopic sight of that weapon.

FIG. 2 illustrates an alternative application of the thermal imager 100. In this application, it is used as part of the sighting system for a weapon 60. Specifically, the housing 110 of the thermal imager is mounted on the weapon 60, such as on the barrel via a mounting bracket 62. The output aperture 130 of the thermal imager 100 is mated to the input aperture 66 of a telescopic sight 64 of the weapon 60. Then, the user's eye observes the output of the visible video display 124 via the output aperture 68 of the telescopic sight.

Returning to FIG. 1, the inventive thermal imager is provided with a display mode selector switch 126. This is typically user operated. It allows selection between a hand held or non magnifying sight mode (full scale mode), on one hand, and a magnifying sight mode, on the other hand (small display mode).

Figure 3:
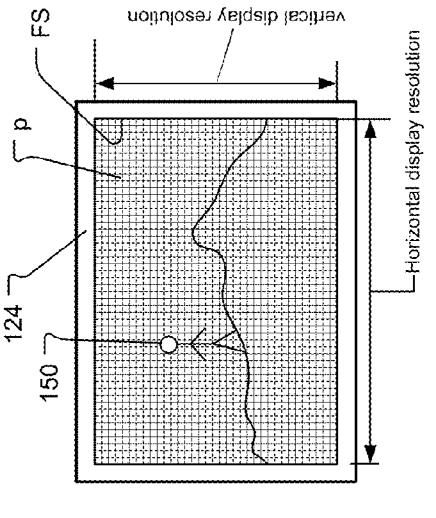
FIG. 3 is a schematic view of a visible video display of the thermal imager displaying the thermal images in a full scale mode.
Figure 4:
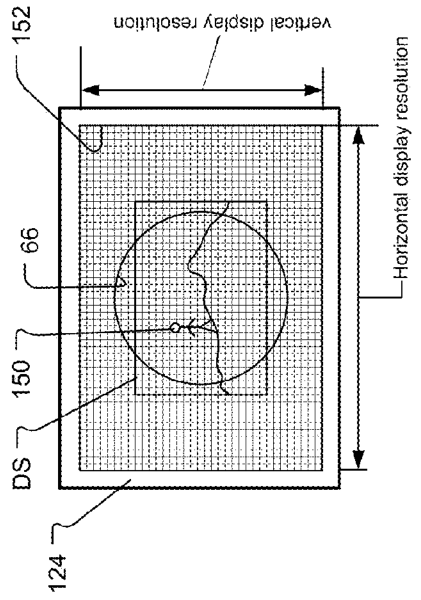
FIG. 4 is a schematic view of the visible video display in which the thermal images are displayed in a small display mode.

The operation of the mode selector 126 and video controller 122 is illustrated with respect to FIGS. 3 and 4 which illustrate the operation in the full scale mode and small display mode, respectively, of the inventive imager 100.

In more detail, FIG. 3 shows the operation in the full scale mode. Specifically, the visible video display 124 includes a matrix of pixels p that is characterized by a horizontal display resolution and a vertical display resolution, the number of columns and rows in the two-dimensional array of pixels p.

In the full scale mode, the thermal video images 150 detected by the thermal video detector 120 are displayed in the entirety of the field of the visible video display 124. As described, in the implementation, this actually requires pixel upsampling by the video controller 122 to compensate for the lower resolution display of the thermal video detector 120 (320 by 240 pixels) with respect to the resolution of the visible video display 124 (640 by 480 pixels). Specifically, each pixel of the thermal video detector 120 is replicated by the controller 122 into four pixels of the video display 124. In this mode, the user has the benefit of using the full scale FS of the visible video display 124. This mode is also used with telescopic sights 64 where the input aperture 66 is the same size or substantially the same size as the output aperture 130 of the thermal imager 100.

FIG. 4 illustrates the display on the visible video display 124 when the mode selector 126 is selected for the small display mode. Only a portion of the pixel field p of the visible light video display 124 is used. Specifically, the thermal video images are only displayed in a small portion DS of the visible video display 124 by the controller 122. As a result, when used with a telescopic sight, for example, the input aperture 66 of the telescopic sight is well matched to the small scale display DS on the visible video display 124. Moreover, this small scale display DS displays at the full resolution of the thermal video detector 120 within the input aperture 66 of the sight 64. Thus, the loss of information due to upsampling into regions of the visible video display 128 that are outside the input aperture 66 of the telescopic sight 64 is avoided. This improves the quality of the display when the thermal imager 100 is mounted to a telescopic sight such as that used on weapons.

While this invention has been particularly shown and described with references to preferred embodiments thereof, it will be understood by those skilled in the art that various changes in form and details may be made therein without departing from the scope of the invention encompassed by the appended claims.

What is claimed is:

1. A thermal imager, comprising:

a thermal video detector for detecting thermal video images and generating a video signal representing the thermal video images;

imaging optics for imaging light onto the thermal video detector;

a display mode selector for enabling selection of a display resolution mode;

a video controller for scaling the video signal in response to the display mode selector; and a visible video display for receiving the scaled video signal from the video controller and displaying the thermal video images;

wherein the display mode selector enables user selection between a small display mode in which the thermal video images are scaled by the video controller to only be displayed in a portion of the visible video display and a full scale display mode in which the video images are scaled by the video controller to be displayed in the entire or substantially the entirety of the visible video display.

2. A thermal imager as claimed in claim 1, wherein a resolution of the thermal video detector is less than the display resolution of the visible video display.

3. A thermal imager as claimed in claim 1, wherein a resolution of the thermal video detector is one quarter the display resolution of the visible video display.

4. A thermal imager as claimed in claim 1, wherein the video controller up-samples the video signals to display the thermal video images in the entire or substantially the entirety of the visible video display when a full scale display mode is selected by the display mode selector.

5. A thermal imager as claimed in claim 1, wherein the thermal video images are displayed on the visible video display at the same scale as detected by the thermal video detector when a small display mode is selected by the display mode selector.

6. A thermal imager as claimed in claim 5, wherein the video controller up-samples the video signals to display the thermal video images in the entire or substantially the entirety of the visible video display when a full scale display mode is selected by the display mode selector.

7. A thermal image display method, comprising:

imaging light onto the thermal video detector;

detecting thermal video images with the thermal video detector;

generating a video signal representing the thermal video images;

receiving selection of a display resolution mode;

scaling the video signal in response to the selected display resolution mode;

displaying the scaled video signal on a visible video display;

mating the visible video display to a magnifying telescopic sight; and selecting a small display mode as the selected display resolution mode in which the thermal video images are displayed in a portion of the visible video display that is visible through the magnifying telescopic sight.

8. A method as claimed in claim 7, further comprising:

a user directly viewing the visible video display; and selecting a full scale display mode in which the video images are displayed in the entire or substantially the entirety of the visible video display.

9. A method as claimed in claim 8, wherein a resolution of the thermal video detector is less than the display resolution of the visible video display.

10. A method as claimed in claim 8, wherein a resolution of the thermal video detector is one quarter the display resolution of the visible video display.

11. A method as claimed in claim 8, further comprising receiving user selection of a small display mode and displaying the thermal video images on only a portion of the visible video display; and receiving user selection of a full scale display mode and displaying the thermal video images in the entire or substantially the entirety of the visible video display.

12. A method as claimed in claim 8, further comprising up-sampling the video signals to display the thermal video images in the entire or substantially the entirety of the visible video display in a full scale display mode.

13. A method as claimed in claim 8, further comprising displaying the thermal video images on the visible video display at the same scale as detected by the thermal video detector.

14. A method as claimed in claim 13, further comprising up-sampling the video signals to display the thermal video images in the entire or substantially the entirety of the visible video display in a full scale display mode.

* * * * *